United States Patent Office 3,332,784
Patented July 25, 1967

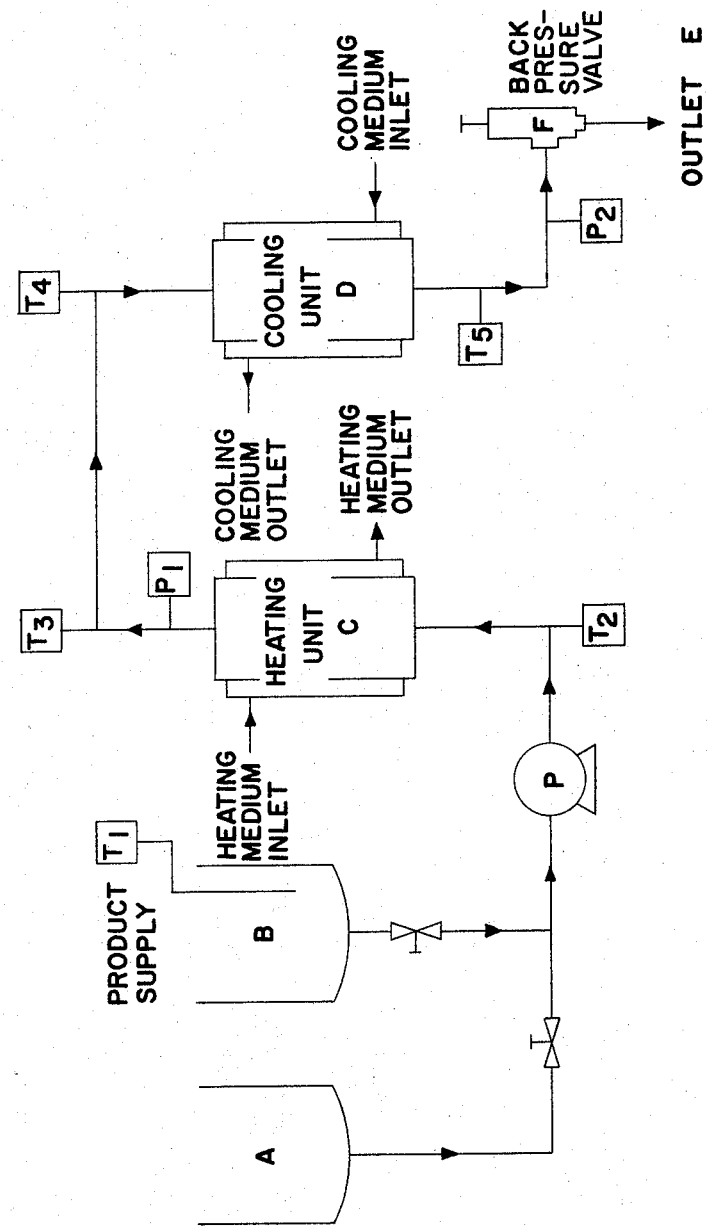

---

3,332,784
PROCESS FOR MANUFACTURE OF CHOCOLATE
WATER-ICINGS
Peter E. Ellis, New York, N.Y., assignor to National
Biscuit Company, a corporation of New Jersey
Filed July 25, 1963, Ser. No. 297,569
9 Claims. (Cl. 99—139)

This invention relates to bakery products and more specifically to chocolate-covered products, and confectionery chocolate suitable for the preparation of water-icings and the like.

In the art, "water-icings" is the term used for coatings which give gloss and a smooth hard finish to the goods they cover. They are also called "flat" icings, a name derived from the horizontal trays which were used for drying. The basic formula for "flat" icings comprises sugar, water, corn syrup, that is glucose, and a stabilizer, usually gelatin. Different coloring agents may be used and if a fruit icing is desired, juice of a water-packed fruit is added. When chocolate water-icings are desired, the basic formula comprises sugar, corn syrup, water, chocolate liquor, gelatin, and cocoa. In some instances, agar-agar has been used instead of or as a supplement for gelatin.

Water-icings, even when free from cocoa, have offered considerable difficulties in the industry and for a while they fell into disuse. One drawback resided in the necessity of drying on trays, a difficulty which has been overcome with more modern equipment, namely continuous bands. Another difficulty was that the glucose of the corn syrup lost its water of hydration during heating, and if the temperature dropped substantially below 110°, the glucose set up and remained as a solid, during the dipping process. These and other difficulties may now be overcome by air conditioning, elimination of very hard water, accurate temperature control and automatic dipping and unloading. In view of the improvements in the manufacture of water-icings, their production, which had almost been abandoned, has now come back into favor, and the finished goods are quite popular among consumers.

One drawback, however, which still increases the cost of manufacture, is the appearance of white spots on the surface of the finished products, and a dull color usually on storage. The discoloration of chocolate products, the appearance of "white spots," the greying, mottled surface and dullness are matters of common experience. These phenomena have been attributed to a plurality of factors, namely, the composition of the fat or hard butter, if a fat or hard butter is used in the coating, the experimental conditions employed during the coating process, staleness, and hot temperature and moisture during storage.

The phenomena of discoloration and dullness are known in the trade as "bloom." They obviously cause considerable financial loss to the manufacturer and retailer because discolored chocolate products are unsalable. Blooming has been associated with either the fat portion or the sugar portion of the chocolate icing. Many attemps to determine the causes and to control the manufacture of chocolate coated products have given some success in the case of coatings comprising a fat.

The use of stabilizers has been taught, for instance in U.S. Patent 2,586,615. U.S. Patent 2,671,027 claims the incorporation of a mixture comprising a partial ester of a higher fatty acid and a polyoxyethylene derivative of a partial ester of a higher fatty acid, in compositions comprising a high proportion of a fat.

Other investigators have pointed out that exposure to heat and the presence of some kind of nuts and incorrect tempering are to be blamed for fat bloom in chocolate goods. For instance in Rev. Intern, Chocolat., 8, 72–6 (1953), Chem. Abstr., 47, 10764 (1953), it is pointed out that tempering has to be done in such a manner as to permit the cocoa butter in the chocolate mass to stiffen in the beta-configuration, in order to avoid discoloration.

In spite of some improvements, the physical and/or chemical nature of the change which accompanies the discoloration is not known, and the observations made, although useful in specific applications, are inadequate to explain all the phenomena of "blooming" in all chocolate coatings. The findings have been so inadequate, that while staleness and hot summer temperature used to be considered the main causes of "blooming," it has been found more recently that fresh products and products kept in winter and fall months also develop "blooming."

With most of the attention centered towards preventing "blooming" in chocolate coatings which contain a hard butter or a fat, the findings made so far, relate only to a specific class of chocolate coatings and have no bearing upon the chocolate icings free from fats or hard butters, which are the subject matter of this instant invention. The blooming in compositions containing a fat, has been associated with the formation of small fat particles on the surface of the chocolate layer, and is called "fat bloom." The second type of blooming, which this instant invention eliminates, is called "sugar bloom" and has been related to the sugar recrystallizing out on the surface. It is believed that water either from the environment or from the base cake is absorbed on the surface of the chocolate layer and dissolves some of the sugar, forming minute drops of syrup. After the moisture evaporates, the sugar recrystallizes, frequently giving large sugar crystals. The "greying" and dullness are usually associated with the haze of recrystallized particles, while the white spots are believer to be due to the formation of the large crystals.

It is an object of the present invention to provide a new composition for chocolate water-icings which is free from "blooming" even after prolonged storage.

Another object is to provide a chocolate water-icing which is composed of small sugar crystals, of size between 1 and 20μ, preferably 1 and 15μ, said crystals forming a continuous homogeneous phase, as contrasted with a coating having irregularly large and small crystals.

Still another object is to provide a chocolate water-icing which forms a hard shell around the base cake after setting and which maintains and protects the shape of the base cake, and which dries in less than one hour to give a fine gloss.

It is a further object to provide a new composition for chocolate water-icings which retains the moisture inside the base cake, and keeps the goods fresh.

Another object is to provide a new improved process for the manufacture and application of the chocolate water-icings, which eliminates all discoloration and "blooming."

Another object is to provide a process for the application of the chocolate water-icings which is economical, time and labor-saving. Still another object is to provide a continuous process for the preparation and application of the water-icings of the invention, the process being capable of giving reproducible results and being less expensive than the batch process.

Another object is to provide a process which minimizes bacterial growth, by the achievement of a more effective and much faster pasteurization of the cocoa.

Another object is to provide a new composition and a new process to make chocolate water-icings for goods known in the art as "trolley goods."

"Trolley goods" is the term used for the products which have an outside coating of chocolate water-icings over a base. The base cakes may for instance, honey or molasses cakes, chocolate wafers, coconut macaroons, fruited spice drops, lemon cream crackers, coffee cakes and cakes covered by marshmallow layers.

The invention will now be described in detail with reference to "trolley goods" where the base is covered with three layers, that is (1) white marshmallow (2) chocolate marshmallow and (3) chocolate water-icing for gloss. It is to be understood, however, that the invention is not to be limited only to the "trolley goods" which go through three dips, but is applicable to all varieties of sweet goods which are to be covered by an external layer of chocolate water-icing, corresponding to the third dip mentioned above in the three-layer covered "trolley goods."

A basic formula for the first marshmallow dip, contains 11 pounds of water, 33 pounds of sugar, 30 pounds of glucose and 14 pounds of invert syrup. The sugar is dissolved in boiling water, glucose and the invert syrup added while the temperature is allowed to reach 130° F. Two pounds of gelatin are then dissolved in hot water, added to the syrup and well beaten.

The temperature is lowered to 96°–98° F., where the specific gravity is between 0.60 to 0.65. This white marshmallow coating is then deposited on the base goods in the dip tanks. The coating sets and dries while the goods are placed on trolleys or on a continuous band in an atmosphere with 25% relative humidity and temperature 88° F. The trolleys and the band may be kept continuously moving for space-saving purposes.

Several procedures are known in the art for the preparation of the second dip of chocolate marshmallow. A simple procedure for making this coating is to add melted chocolate liquor to the white trolley marshmallow, or to cream cocoa and plastic butter and add this blend to some of the beaten white trolley marshmallow. The use of red color is optional.

It may also be possible to use a formulation for the chocolate marshmallow dip as follows: three hundred and sixty pounds of sugar are mixed with 100 pounds of boiling water. The syrup so formed is mixed with 13 pounds of corn syrup, 2 pounds and 2 ounces of gelatin, and the blend is added to 5 pounds of cocoa and 10 pounds of plastic butter previously creamed. The mixture is then beaten to the desired consistency and placed in the dip tank. The goods are then dipped into the dip tank to provide the second dip over the first white marshmallow, and allowed to dry at 88° F. in an atmosphere of 25% relative humidity.

Although the instant invention does not specifically relate to the two marshmallow coatings, these compositions have been set forth in detail to indicate the amount of residual moisture present after application. In fact, when the third layer of chocolate icing is applied over the base cake and over the two coatings of white marshmallow and chocolate marshmallow as described above, no matter whether the chocolate marshmallow is prepared according to the first or the second procedure, about 15% of moisture is present, which must be sealed by the third layer. While it is desirable to retain the moisture to preserve the freshness and palatability of the goods, equilibrium conditions between the environment and the inner base cake are continuously subject to variations during storage, before consumption. Loss of moisture from the base cake and from the two layers of white and chocolate marshmallow may occur, causing hardening of the product and moisture accumulation on the third external chocolate water-icing. The net result is staleness of the product and dullness and greying of the chocolate icing. Moisture on the chocolate water-icing may also accumulate from the external environment, if the humidity is excessive, with the same result, namely "sugar bloom" on the chocolate water-icing.

The composition for the third chocolate water-icing and the process of the invention comprise known ingredients and known operations, but in such a novel combination that the results represent a substantial advance in a trade where the preparation of chocolate water-icings, resistant to "bloom," was believed to be out of reach.

Although the process of this instant invention, which will be described below, gives satisfactory results even where gelatin is used as a binder, as in the conventional process, it has now been found that a great improvement may be obtained if a water-absorbent, non-jelling material is introduced.

Although several water-absorbing agents may be used, such as agar, carboxymethyl cellulose, starch and other polysaccharides, such as for instance locust bean gum, the preferred agents are the alginates and specifically calcium ammonium alginate. The latter substance is sold by the Kelco Company under the name of Keltose. The substance, even when added in small amounts, for instance 2 ounces per 100 pounds of sugar, prevents the finished icings from sticking and cracking. Keltose does not gelatinize, and holds the water of hydration, a fact which is of great advance over the gelatinizing agents which "weep," that is, which let the water separate from the icings. The resulting icings are light and tender, with the Keltose totally odorless and tasteless, so that no foreign odor or taste is imparted to the finished goods. When incorporated into the icing in the proportion of about 4 ounces per 100 pounds of liquid sugar, that is approximately a 67% sugar solution, Keltose maintains the moisture content of the finished product at about 12.5%, a most desirable range to prevent staleness and hardening and to retain palatability.

The alginate also contributes to the smoothness and shine of the surface, because it effectively fills the interspaces between the different sugar crystals, providing a continuous surface. It is desirable that the chocolate water-icings of this instant invention be completely dry and ready for packaging in less than one hour. For this reason, the composition, in accordance with the instant invention, is prepared free from invert syrup. The elimination of invert syrup from the mixture, however, is not part of this invention, because it was known in the art that invert syrup retards and even prevents, if present in large amounts, the crystallization of sucrose and dextrose, thus interfering with the formation of a quick-drying chocolate icing. It has been found however, contrary to common knowledge, that rapid heating up to 240° F., in accordance with the instant invention, does not hydrolyze the sucrose to any noticeable extent, and that no substantial amount of invert syrup is formed, sufficient to interfere with the crystallization of the chocolate icing.

Another feature of the composition of this instant invention is that it permits the elimination of corn syrup. Corn syrup was used in icings not only as an inexpensive source of glucose but because of the presence of dextrins which imparted body and consistency to the finished products. The presence of a small amount of corn syrup was believed to be necessary to prevent too rapid crystallization of the sucrose and the formation of irregular large crystals. It has now been found that by the proper control of mixing during both the heating and cooling period, too rapid crystallization may be avoided even in the absence of corn syrup. Although the presence of corn syrup in small amount, between 0.5% and 2% and preferably 1.42%, is not harmful and may be advantageous in view of the low cost of this ingredient, its presence is not necessary.

The composition used for the chocolate water-icing varies in total solid content between 72 and 79%, preferably 74 to 75.9%. Liquid sugar, which has a concentration of sugar about 67.1%, is used in amount of 346.5 lbs. The composition additionally comprises 113.5 lbs. of 4X sugar, 0.75 lb. of Keltose, 20.5 lbs. of cocoa, 6.5 lbs. of water, and 32 grams of sorbic acid as a bacterial growth-preventing agent. The addition of finely granulated sugar, in amount of 12.5 lbs., is optional. The above amounts correspond to 69.3% of liquid sugar, 22.68% of 4X sugar, 2.52% of fine granulated sugar, 0.15% of Keltose, 1.25% of water, 4.08% of cocoa and 0.02% of sorbic acid.

It is to be understood that the amount of each ingredient may be varied within a range. The proportion of cocoa may be varied between 3 and 5%, of the liquid sugar between 65 and 75%, of the 4X sugar between 21 and 24%, of the finely granulated sugar between 0 and 4%, of Keltose between 0.05% and 0.50%, without prejudicially affecting the properties of the finished icings. Sorbic acid is the preferred agent for the purpose of preventing bacterial growth and is used in amount of 32 grams for the above composition.

The achievement of a continuous homogeneous deposit of small sugar crystals, which is basic in our invention, is the result of the careful control of a number of factors, namely rate of crystallization, degree of supersaturation of the sugar solution, mixing and temperature control.

The main features of the process are (1) short time pasteurization, (2) quick heating of the syrup to 240° F., (3) quick cooling to 110–135° F., (4) rapid mixing during both heating and cooling steps, (5) complete solubilization of the sugar solids and complete homogenization of the mixture during the heating step.

In order to fully evaluate the process according to this instant invention, a quick description of the process known in the art for the preparation and application of the chocolate water-icings will now be described.

The conventional process is conducted on a batch scale and comprises a mixing unit, with a rotatable shaft turning at a speed of 1500 r.p.m. The process requires in a first step the preparation of the chocolate syrup in a heating vessel, where liquid sugar, cocoa, and a little sorbic acid are kept at 180° F. for a period of 30 minutes to achieve complete pasteurization of the cocoa. The cocoa syrup thus prepared is added to liquid sugar, gelatin, 4X sugar and water in the first mixing vessel. After all the ingredients are well mixed, the resulting composition is transferred to a holding tank at 95° F., from which it is transferred to the dipping tank which is kept at 95° F. Prolonged agitation and gradual temperature rise have been considered essential.

According to the conventional process, the temperature in the heating vessel is slowly raised to 180° F., kept at 180° F. for 30 minutes and then lowered to 95° F. The overall period of time is about one and one-half hours. The temperature is not allowed to rise above 180° F., in order to prevent sucrose hydrolysis to invert syrup.

On the other hand, in the process according to this instant invention, the temperature is allowed to rise up to 240° F., and provision is made for quick heating and cooling. Also, in the process according to this instant invention, it is not necessary to have a two-stage operation, with the preparation of the cocoa syrup conducted separately from the incorporation of the cocoa syrup into the other ingredients. As it will appear below, in the process according to this instant invention, all the ingredients are mixed in one single processing. Thus the process represents a substantial revolutionary advance in the art, isofar as it provides for a quick temperature drop from 240° F. to 110° F. and simplification of the procedure. Contrary to the old belief that gradual cooling was necessary to prevent sugar "bloom," it has now been found that a continuous deposit of small crystals helps to prevent accumulation of water on the surface with subsequent discoloration, and that the formation of a continuous deposit of small crystals is favored if the temperature drop occurs abruptly, provided efficient mixing is maintained during the cooling step.

The results obtained by the use of the composition and the process, according to this instant invention, are striking, as compared with the results obtained by the conventional process and the conventional formulation. FIGURES 1–6 as it will be discussed below, remarkably show the differences.

The process according to this invention is carried out on a continuous operation. The accompanying flowsheet illustrates the new process of this invention. Referring to the flow sheet, FIG. 7, A represents a heating zone for heating the water, for instance a steam kettle, which may be connected or disconnected with the premixing zone B. Water, in zone A, is first pumped through the heating and cooling units C and D respectively, in order to condition the apparatus, prior to the beginning of the process to establish system flow and to attain system operating temperatures. While the apparatus is being conditioned, the different ingredients, liquid sugar, cocoa, 4X sugar, the finely granulated sugar if used, water, Keltose, the latter dry-blended under stirring with a small portion of fine granulated or 4X sugar, sorbic acid, are transferred to the premixing zone B, and mixed for 10 to 15 minutes. The temperature in zone B is kept preferably at 150° F., although a temperature range of 130° F. to 170° F. is satisfactory.

After the temperature reaches 240° F. in zone C and 110° F. in the cooling unit D, the connection of zone A is closed, and the syrup is pumped from zone B into the heating zone C. Vessel A is used as an alternate tank during the process to maintain a continuous supply.

The heating and cooling steps are conducted through a 2-unit heat transfer apparatus where the process is truly continuous and where efficient mixing is maintained throughout both stages.

The two units are shown in the flow sheet at C and D. Although many types of apparatuses are suitable to carry out of the invention, a pair of jacketed insulated tubes is satisfactory. Good results have been obtained with the apparatus marketed by the Girdler Company under the name of Votator, although the invention is not limited in scope to this specific apparatus.

Since the process is continuous, high output rate may be maintained even when the heating and cooling units are merely 3 in. in diameter and 12 in. long. The two units essentially are constituted of tubular sections which are provided with a shaft, an annular space for the passage of the material, annular space on the outside of the tubular sections for the inlet and outlet of the heat transfer medium, and an insulating covering. This apparatus is suitable to maintain good agitation and provides high volume of material per unit area of heat transfer surface. The apparatus maintains the same temperature at any given point in the system, and is provided with a pump shown at P, to maintain a constant rate of flow of material, and with scraper blades (not shown) on the shaft to prevent accumulation of the material in the heating zone and to avoid overheating.

The apparatus is also provided with a back pressure valve F, to maintain constant system pressure for pump rate regulation and to permit heating with high pressure steam. $P_1$ represents the product pressure and $P_2$ in the flow sheet represents back pressure of the product.

The unit, 3 in. in diameter and 1 foot long, gives a rate of 750 ml. per minute, very conveniently, but may be adapted to give a rate as high as 1300 ml. per minute, without seriously affecting the quality of the finished icings, merely by increasing the rate of feed. With this size of equipment, 75 to 200 pounds of material per hour may be handled.

Mixing in both the heating and cooling zones is maintained continuously and at a very high rate, at least 350 and preferably 1082 r.p.m. This efficient mixing is necessary to prevent crystallization at this stage and possibly to break the particle size of the granulated sugar, if any is present.

The length of time the material remains in the heating zone is 0.5 to 0.6 minute, where the temperature, indicated at $T_3$, is preferably 240° F., but a range of 220° to 250° F. is still satisfactory. The residence time in the heating zone varies between 25 seconds and 1 minute, still giving satisfactory results. The preferred residence time is between 30 and 40 seconds. Prolonged residence time, more than one minute, in the heating zone is undesirable, because it would require a corresponding longer residence time in the cooling zone and also because it might spoil the product, due to the formation of invert syrup.

In the cooling zone the preferred residence time is also between 30 and 40 seconds, but it may be as short as 25 seconds and as long as one minute. The material leaves the heating unit at $T_3$, that is at a temperature of 240° F., enters the cooling unit at $T_4$, that is at a temperature of 235° to 240° F., and leaves the cooling unit at $T_5$, usually at 125° F., but as low as 110° F. and as high as 135° F. The temperature drop from 240° F. to 110° F. between $T_4$ and $T_5$ takes less than one minute, namely 0.5 to 0.6 minute.

The material as it leaves the cooling unit has a viscosity between 400 and 850 centipoises.

The product is then continuously transferred to a holding tank (not shown) and then continuously transferred to the dipping tank (not shown). Here the temperature is maintained preferably at 130° F., not lower than 110° F., and not higher than 150° F.

The process has been successfully carried out for as long as 24 hours, with an output of 100 pounds per hour. With a larger apparatus, for instance 4″ in diameter and 5 ft. long, the rate may be increased to 600–700 pounds per hour of finished material, ready for the dipping tank.

The results show that moisture is constant and comparable in the new products with the products prepared according to the conventional batch process, where gelatin is used. The loss of moisture under winter storage conditions is negligible. The taste and "bite" characteristics are the same with the new products, or slightly improved, insofar as they are somwhat softer.

Storage tests gave striking results, and retention of high gloss and high palatability even after 4 to 6 months. The tests were conducted both at room temperature, that is 75° F. and 50–60% humidity, and under winter storage conditions, that is 75° F. and 30% humidity. Table I below gives in columns 2 and 4 the results of the storage tests of the chocolate water-icings prepared according to this invention, designated "Exper." and in columns 3 and 5 the results with the conventional formulation. The tests were conducted for 12 weeks.

TABLE I.—COMPARISON OF STORAGE TESTS BETWEEN (1) THE NEW PROCESS AND NEW COMPOSITION, DESIGNATED "EXPER." AND (2) THE CONVENTIONAL PROCESS RUN ON A BATCH SCALE WITH THE CONVENTIONAL FORMULATION [1]

| Weeks in Storage | Percent Moisture | | | |
| --- | --- | --- | --- | --- |
| | Room Temp. Storage | | Winter Conditions Storage | |
| | Exper. | Conventional | Exper. | Conventional |
| 0 | 12.3 | 12.7 | 12.3 | 12.7 |
| 2 | 12.4 | 12.6 | 11.8 | 11.3 |
| 4 | 12.7 | 12.1 | 12.1 | 12.5 |
| 6 | 12.1 | 12.5 | 11.2 | 11.8 |
| 8 | 10.4 | 11.3 | 9.3 | 10.5 |
| 12 | 11.3 | 11.4 | 10.8 | 10.6 |

[1] By the conventional formulation, it is meant the composition comprising gelatin and corn syrup.

Table II below shows the comparison both at room temperature and under winter conditions between the conventional composition processed on a batch scale, in colums 3 and 5 and the same conventional composition processed according to the new process of this invention, in columns 2 and 4.

TABLE II.—COMPARISON OF STORAGE TESTS BETWEEN (1) NEW PROCESS-CONVENTIONAL COMPOSITION AND (2) THE CONVENTIONAL PROCESS WITH CONVENTIONAL COMPOSITION [1]

| Weeks in Storage | Percent Moisture | | | |
| --- | --- | --- | --- | --- |
| | Room Temp. Storage | | Winter Conditions Storage | |
| | New Process, Conventional Composition | Conventional | New Process, Conventional Composition | Conventional |
| 0 | 12.7 | 13.2 | 12.7 | 13.2 |
| 2 | 12.9 | 12.8 | 12.1 | 12.1 |
| 4 | 12.6 | 13.0 | 12.5 | 12.4 |
| 6 | 10.3 | | 10.8 | |
| 10 | 11.2 | 12.0 | 10.9 | 10.9 |

[1] Conventional composition here means the composition comprising gelatin and corn syrup.

The data from Table II indicate that the moisture content does not substantially vary between the products prepared by the new process with the conventional composition and the products prepared by the conventional composition according to the conventional process.

Table III below shows the results of a panel evaluation of 10 judges. While the bite and taste properties are not significantly different, the most striking property is the appearance of the new products, that is gloss, smooth and fine surface characteristics, as compared with the products prepared according to the conventional batch process.

TABLE III.—PANEL EVALUATION: COMPARISON OF EXPERIMENTAL FORMULA (NEW PROCESS, NEW COMPOSITION) WITH CONVENTIONAL FORMULA (OLD PROCESS, OLD COMPOSITION [1]) (PANEL OF 10 JUDGES)

| Sample | Weeks in Storage | Prefer [3] | | |
| --- | --- | --- | --- | --- |
| | | Taste | "Bite" | Appearance |
| Experimental | 6 | 2 | 1 | 10 |
| Conventional | 6 | 1 | 2 | |
| No Preference [2] | | 7 | 7 | |
| Experimental Winter | 6 | 2 | 2 | 10 |
| Conventional Winter | 6 | | | |
| No preference [2] | | 8 | 8 | |

[1] Conventional composition means the composition which comprises gelatin and corn syrup.
[2] "No Preference" means no detectable difference in characteristics under evaluation between the two samples, namely taste, "bite," appearance.
[3] "Prefer" means better taste, softer bite, superior appearance.

TABLE IV.—PANEL EVALUATION: COMPARISON BETWEEN (1) THE CONVENTIONAL PRODUCTS AND (2) PRODUCTS PREPARED ACCORDING TO THE CONVENTIONAL COMPOSITION, [1] BY THE NEW PROCESS

| Sample | Weeks in Storage | Prefer [3] | | |
| --- | --- | --- | --- | --- |
| | | Taste | "Bite" | Appearance |
| New Process—Old Composition | 4 | | 2 | 10 |
| Conventional | 4 | | 3 | |
| No Preference [2] | | 10 | 5 | |
| New Process—Old Composition Winter Storage Conditions | 4 | 3 | 4 | 10 |
| Conventional—Winter Storage Conditions | 4 | 1 | 3 | |
| No Preference [2] | | 6 | 3 | |

[1] Conventional composition here means the composition comprising gelatin and corn syrup.
[2] "No Preference" means no detectable differences in characteristics under evaluation between the two samples, taste, "bite", appearance.
[3] "Prefer" means better taste, softer bite, superior appearance.

The results in Tables III and IV indicate that even with the conventional composition, great improvement in gloss and appearance is achieved by the new continuous process according to the instant invention.

For the purpose of better illustrating the invention, the following examples will be described in detail.

EXAMPLE I

Liquid sugar, 345.5 lbs. was added to the heater B and heated up to 150° F. Then 0.75 pound of Keltose blended with 1 pound of 4X sugar, 112.5 pounds of 4X sugar, cocoa, 20.5 pounds, were added under constant mixing, with a propeller-type electric mixer, rotating at 1500 r.p.m. Thirty-two grams of sorbic acid and 6.5 lbs. of water were added last. The mixture was kept at 150° F. for 10 to 15 minutes. The syrup was then pumped to the heater C which was adjusted at 240° F. The heating medium was water, heated in a steam kettle, shown at A, and then pumped through the system. The heating of the water and pumping through the system was begun one-half hour prior to passing the material through the heating unit in order to assure proper operating conditions. A pressure of 25 lbs. was maintained to assure a temperature of 240° F. The mixture entered the heating unit at a temperature of 150° F. and was passed continuously through the heating unit C, where the residence time was 0.5 minute. The material left the heating unit at a temperature of 240° F., corresponding to $T_3$, in the flow sheet, and entered the cooling unit D at a temperature of 235° F., corresponding to $T_4$ in the flow sheet. The residence time in the cooling unit was 0.5 minute. A back pressure of 25 lbs. was maintained, indicated in the flow sheet at F, to avoid product flashing, and to maintain a constant pump rate. The material was then passed to the dipping tank. The rate of flow was 700 ml. per minute, with the system maintained in continuous operation for 9 hours. The base cakes collected after the icing was applied, were completely dry after 45 minutes. They exhibited good gloss, good palatability and were stable at a temperature of 88° F. They were not discolored after 6 months.

EXAMPLE II

The process as described in Example I was repeated, but an additional 12.5 lbs. of finely granulated sugar was added. The granulated sugar was mixed with the Keltose and the dry mixture added to the steam kettle. The results were essentially the same as in the absence of the granulated sugar.

EXAMPLE III

The process was repeated using the same amounts of ingredients as in Example I but the rate of output was increased to 1300 ml. per minute.

EXAMPLE IV

The following experiment was conducted according to the new process, but some corn syrup was added. Liquid sugar, 339.5 pounds, and 7 pounds of corn syrup were placed in the preheating zone B and heated up to 150° F. Then 0.75 pound of Keltose blended with 1 pound of 4X sugar, 112.5 pounds of 4X sugar, cocoa, 20.5 pounds, were added under constant mixing with a propeller type electric mixer, rotating at 1500 r.p.m. Thirty-two grams of sorbic acid and 6.25 pounds of water were added last. The mixture was kept at 150° F. for 10 to 15 minutes. The syrup was then pumped to the heater C and processed as in Example I.

From the foregoing it is clear that the instant invention represents a substantial advance in the art of chocolate enrobed products, and specifically the chocolate water-icings, since it provides a composition and a process which obviate the difficulties resulting from the graying and blooming of the chocolate on storage and which give products retaining high gloss for a long period of time. Those skilled in the art will readily visualize that departures are possible within the scope of this invention, which is only going to be defined by the appended claims.

What is claimed is:
1. An continuous process for the manufacture of chocolate water-icing suitable for covering base foods, which comprises:
 (a) feeding into a premixing zone liquid sugar containing between 64% and 67% solid sugar,
 (b) adding cocoa, 4X sugar, finely granulated sugar and a binder which is a member selected from the group consisting of an alginate and gelatin, sorbic acid, and water, said liquid sugar being in proportion of between 65 and 75% of the total composition, said cocoa being in proportion of between 3 to 5%, said 4X sugar being in proportion of between 21 and 24%, said binder being in proportion of 0.15%, said finely granulated sugar being in proportion of between 0 and 4%,
 (c) maintaining the temperature in said premixing zone between 130° and 170° F. to obtain a first mix,
 (d) continuously transferring said first mix to a heating zone of such heat transfer capacity that the temperature reaches 240° F. with a residence time of 25 seconds to one minute,
 (e) continuously cooling said material in a cooling unit of such heat transfer capacity that the temperature drops between 110° and 135° F. with a residence time of 25 seconds to one minute,
 (f) continuously discharging said material from said cooling zone into a holding zone,
 (g) and continuously feeding said material to a dipping zone, where said base foods are covered with chocolate water-icings.

2. A continuous process for the manufacture of chocolate water-icings suitable for covering base foods, which comprises:
 (a) feeding into a pre-mixing zone 345.5 parts of liquid sugar, containing between 64% and 67% solid sugar,
 (b) adding to same mixing zone 0.75 lb. of a binder which is a member selected from the group consisting of an alginate and gelatin, 20.5 lbs. of cocoa, 113.5 lbs. of 4X sugar, said binder being previously mixed with one pound of liquid sugar, 32 grams of sorbic acid, 6.5 pounds of water,
 (c) maintaining the temperature in said premixing zone between 130° and 170° F.,
 (d) continuously transferring said first mix to a heating zone to obtain a first mix, heating to a temperature in said heating zone of 230° to 270° F., with a residence time in said heating zone between 25 seconds and 0.6 minute,
 (e) cooling said material in a cooling zone of such heat transfer capacity that the temperature drops to 110°–135° F. with a residence time of 0.5 to 0.6 minute,
 (f) continuously discharging said material from said cooling zone into a holding zone and,
 (g) continuing feeding said material to the dipping zone where said base foods are covered with chocolate water-icings.

3. The process according to claim 2 wherein said premixing zone is maintained at 150° F. and said binder is blended with 4X sugar prior to addition to said premixing zone.

4. The process according to claim 2 wherein said heating zone is maintained at 240° F.

5. The process according to claim 2 wherein the output from said cooling zone is between 700 ml. and 1300 ml. per minute.

6. The process according to claim 2 wherein 12.5 lbs. of finely granulated sugar are added to said premixing zone.

7. The process according to claim 1 wherein corn syrup in amount of 1.42% is added to said premixing zone.

8. The process according to claim 1 wherein the material in said heating and cooling zones are mixed by a mixing element, rotating at 350 to 1082 r.p.m.

9. The process according to claim 1 wherein the residence time in said heating and cooling zones is between 30 and 40 seconds.

References Cited

UNITED STATES PATENTS 2,796,348  6/1957  Colten et al. _____ 99—23

FOREIGN PATENTS 515,430  12/1939  Great Britain.

OTHER REFERENCES

Biscuit and Cracker Production—Ralph M. Bohn, American Trade Publishing Co., N.Y. 1957, pp. 181–185.

A. LOUIS MONACELL, *Primary Examiner.*

RAYMOND N. JONES, *Examiner.*

J. HUNTER, *Assistant Examiner.*